United States Patent [19]

Coburn, Jr.

[11] Patent Number: 4,695,336

[45] Date of Patent: Sep. 22, 1987

[54] PHOSPHORESCENT MATERIAL AND PROCESS OF MANUFACTURE

[76] Inventor: Joseph W. Coburn, Jr., P.O. Box 1585, Lakewood, N.J. 08701

[21] Appl. No.: 909,035

[22] Filed: Sep. 18, 1986

Related U.S. Application Data

[60] Division of Ser. No. 786,759, Oct. 11, 1985, Pat. No. 4,663,214, and a continuation-in-part of Ser. No. 687,502, Jan. 4, 1985, abandoned, which is a continuation of Ser. No. 581,340, Feb. 17, 1984, abandoned, which is a continuation-in-part of Ser. No. 512,034, Jul. 8, 1983, abandoned.

[51] Int. Cl.[4] .......................... B32B 31/12; B44F 1/14

[52] U.S. Cl. ...................................... 156/67; 156/209; 156/276; 156/283; 156/310

[58] Field of Search ................. 156/67, 279, 283, 276, 156/310, 209; 428/204, 206, 207, 690, 913; 40/543, 542, 615; 427/157, 158; 350/106, 109

[56] References Cited

U.S. PATENT DOCUMENTS

| | | | |
|---|---|---|---|
| 2,990,308 | 6/1961 | Goldstein | 428/913 X |
| 3,309,257 | 3/1967 | Borack | 428/913 X |
| 3,468,744 | 9/1969 | Reinhart | 428/913 X |
| 3,873,390 | 3/1975 | Cornell et al. | 428/913 X |
| 3,988,494 | 10/1976 | McAdow | 428/328 |
| 4,343,879 | 8/1982 | Drexler et al. | 428/913 X |

*Primary Examiner*—Donald E. Czaja
*Assistant Examiner*—Geoffrey L. Knable
*Attorney, Agent, or Firm*—R. Gale Rhodes, Jr.

[57] ABSTRACT

Phosphorescent material including, in addition to a support layer of substantially opaque material, a body of substantially iridescent material providing an iridescent decorative effect in visible light and a body of phosphorescent material intermediate the support layer and transparent iridescent material and which phosphorescent material provides after-glow in darkness; and processes for making the same.

4 Claims, 7 Drawing Figures

PHOSPHORESCENT MATERIAL AND PROCESS OF MANUFACTURE

CROSS-REFERENCE TO RELATED APPLICATIONS

This is a division of application Ser. No. 786,759, filed Oct. 11, 1985, now U.S. Pat. No. 4,663,214 and a continuation-in-part of pending U.S. patent application Ser. No. 687,502 filed Jan. 4, 1985 (now abandoned) which is a continuation of U.S. patent application Ser. No. 581,340 filed Feb. 17, 1984 (now abandoned) which was a continuation-in-part of U.S. patent application Ser. No. 512,034, filed July 8, 1983 (now abandoned).

FIELD OF THE INVENTION

This invention relates generally to new and improved phosphorescent material, more particularly to phosphorescent material decorative in visible light, and to new and improved processes of manufacturing the same.

BACKGROUND OF THE INVENTION

Numerous phosphorescent materials are known to the prior art, such as phosphorescent films used to make traffic signs, advertising signs, Christmas decorations, labels and tags, window displays, arts and crafts, decorative decals, etc. Such phosphorescent materials, as known to those skilled in the art, exhibit the quality or characteristic of phosphorescence which, as is further known to those skilled in the art, is luminescence caused by the absorption of radiation, such as visible light or ultra-violet light, which continues for a noticeable time after these radiations have stopped; this luminescence which occurs in the dark after the phosphorescent material has been exposed to such radiations is commonly referred to as the after-glow.

A major problem associated with typical prior art phosphorescent material or film is that when viewed in visible light, e.g. sunlight, incadescent or fluorescent light, such materials typically are provided in only one color, namely an unattractive or eerie green. Articles, such as those noted above, which may be made from such phosphorescent materials, are typically sold inside of a store illuminated by visible light such as incadescent or fluorescent light or sunlight coming through a window, and hence the articles at the point of purchase are unattractive and without decorative appeal due to their above-noted unattractive or eerie green color. Of course, some colored phosphorescent materials are known to the prior art, but these colored phosphorescent films are created by putting colored filters on the films or by adding colorants, such as various colored pigments, to the films but it has been found that such coloring techniques substantially decrease the after-glow properties and hence cause the products to be substantially worthless or of little value due to their greatly diminished after-glow characteristic.

Accordingly, there exists a need in the phosphorescent material art for phosphorescent film, and process of manufacture therefor, which film is decorative in visible light whereby articles produced from the film will be decorative to the naked eye of the potential purchaser at the point of sale, typically the interior of a store illuminated by visible light, whereby the sale of such articles is enhanced.

SUMMARY OF THE INVENTION

The primary objects of the present invention are to provide improved phosphorescent material particularly improved phosphorescent film decorative in visible light, and process of making same, whereby articles produced from the decorative phosphorescent film are decorative in visible light at the point of purchase.

Improved phosphorescent material embodying the present invention, overcoming the above-noted prior art problem, and satisfying the above-noted objects, may include, in addition to a support layer of substantially opaque material, a body of substantially transparent iridescent material providing an iridescent decorative effect in visible light and a body of phosphorescent material intermediate the support layer and transparent iridescent material and which phosphorescent material provides the after-glow in darkness.

DESCRIPTION OF THE PREFERRED EMBODIMENT

Figure 1:
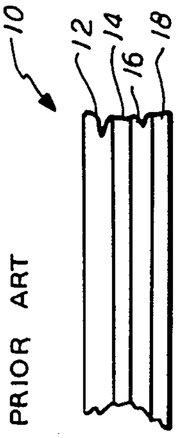
FIG. 1 PRIOR ART
FIG. 1 is a diagrammatic, cross-sectional, partial view of prior art phosphorescent material or film.

Referring first to FIG. 1 and again to the above-noted prior art phosphorescent material, there is shown a typical prior art phosphorescent film or material 10 comprising a top layer 12 of phosphorescent pigment suspended in a plastisol (e.g. PVC dissolved in a plasticizer), an opaque background layer 14 of white pigment suspended in a plastisol, a layer of pressure-sensitive adhesive 16 and a layer of release liner or paper 18. As noted above in the background of the invention, such prior art phosphorescent film while generally found to be suitable for most purposes requiring the after-glow is not attractive to the naked eye, such as for example the naked eye of a purchaser at the point of sale in the interior of a store illuminated by visible light, due to the fact that in visible light the prior art phosphorescent film 10 is unattractive or an eerie green and hence has no eye appeal since it is not decorative.

Figure 2:
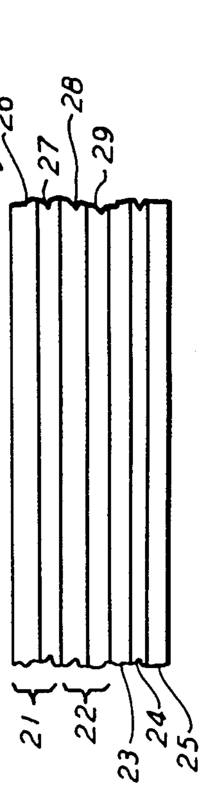
FIG. 2 is a diagrammatic, cross-sectional, partial view of improved phosphorescent film or material embodying the present invention.

Referring now to FIG. 2, there is illustrated, diagrammatically, improved phosphorescent material, particularly phosphorescent film or material 20 embodying the present invention and which is decorative in visible light. The material 20 may include a body of substantially transparent iridescent material 21 providing an iridescent decorative effect in visible light, an intermediate body of phosphorescent material 22 providing the after-glow in darkness, and a support layer 23 of substantially opaque material. If additional opacity is required or desired, the bottom surface of the support layer 23 of opaque material may be suitably metallized such as being aluminized with a suitable aluminum or aluminum alloy to a thickness of 2–3 ohms per square area. Additionally, the phosphorescent material 20, particularly if the phosphorescent material is to be used for articles such as decals, etc., which are to be adhered to various surfaces, may include a layer of pressure-sensitive adhesive 24 covered by a suitable release liner or coating 25.

In accordance with the further teachings of the present invention, the body of substantially transparent iridescent material 21 may comprise a layer of clear plastic film 26 and a layer of substantially clear dry adhesive 27 having iridescent particles or iridescent glitter flakes residing thereon and adhered thereto. The intermediate body of phosphorescent material 22 may comprise a layer of substantially clear, dry adhesive 28 having phosphorescent particles or pigment residing thereon and adhered thereto and a layer of opaque plastic film 29. The layer of clear plastic film 26 may be either thermoplastic or thermosetting material, such as for example rigid PVC, polycarbonate, acrylic or polyester, and in the preferred embodiments of the present invention from 1–3 mils in thickness. The clear, dry adhesive 27 and 28 may be suitable clear 100% solids adhesive such as a clear acrylic hot melt pressure sensitive adhesive. In preferred emobodiments of the present invention the layer of clear, dry adhesive 27 and 28 was 1–2 mils in thickness. In accordance with the teachings of the present invention, the particles of glitter material or glitter flake were finally chopped Mearl Iridescent Film IF-3121 produced and sold by the Mearl Corporation, 1050 Lower South Street, Peekskill, New York 10566. In a preferred embodiment of the present invention, the iridescent particle or iridescent glitter flakes were cut to 1/64 inch squares, although other geometrical shapes may be used, such as hexagons, circles, etc. The phosphorescent pigment residing on and adhered to the layer of dry adhesive 28 may be any one of several commercially available phosphorescent pigments known to the prior art. The support layer 23 of substantially opaque material may be opaque white plastic film and may be either thermoplastic or thermosettable plastic such as rigid PVC, polycarbonate, acrylic or polyester. In preferred embodiments of the present invention, such opaque material was 1–3 mils thickness. The layer of pressure sensitive adhesive 24 may be any one of several commercially available pressure sensitive adhesives known to the prior art such as those of the arylic, synthetic rubber, etc., type. The release liner or coating 25 may be any one of several commercially available release liners known to the prior art such as silicone coated release liner material.

Alternative to the layer of clear plastic film 26 and layer of clear, dry adhesive 27 having iridescent particles residing thereon and adhered thereto, the body of substantially transparent iridescent material 21 may be a layer of Mearl Iridescent Film IF-3121 from the Mearl Corporation noted above.

Figure 3:
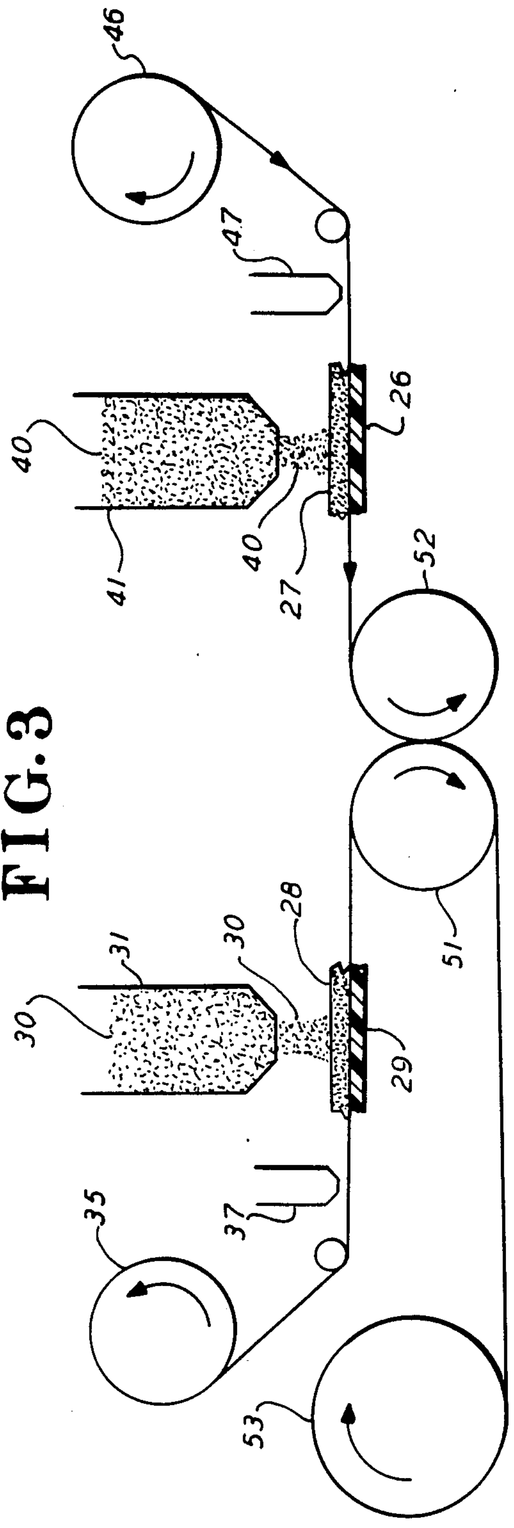
FIG. 3 is a diagrammatic illustration of apparatus and process for producing the improved phosphorescent film of the present invention.

Referring now to FIG. 3 and to apparatus and method of providing the phosphorescent material or film 20 of the present invention, a layer of dry phosphorescent particles 30 is dispensed from a suitable hopper 31 and applied to a layer of dry adhesive 28 residing on and adhered to the top surface of a layer of opaque white plastic film 29 as they are advanced beneath the hopper 31; for clarity of understanding, the layer of opaque white plastic film 29 and layer of dry adhesive 28 are partially shown in enlarged cross-sectional view beneath the hopper 31. Simultaneously, a layer of dry iridescent particles 40 is dispensed from a suitable hopper 41 and applied to a layer of dry adhesive 27 residing on and adhered to the top surface of a layer of clear plastic film 26 as they are advanced beneath the hopper 41. Thereafter, the opaque white plastic film 29 and dry adhesive 28 having the layer of dry phosphorescent particles 30 residing thereon and the clear plastic film 26 and dry adhesive 27 having the layer of dry iridescent particles 40 residing thereon are advanced together between a pair of nip rollers 51 and 52 where lamination takes place. It will be understood that the layer of dry adhesive 28 may be applied to the top surface of the opaque white plastic film 29 intermediate the let-off roll 35 and the hopper 31 by a suitable dry adhesive applicator indicated diagrammatically as 37 and, similarly, the layer of dry adhesive 27 may be applied to the top surface of the layer of clear plastic film 26 intermediate the let-off roll 46 and the nip roll 52 by a suitable dry adhesive applicator indicated diagrammatically as 47. The lamination is thereafter taken up on a take-up roll 53 whereafter, if desired as noted above, the lamination, that is the bottom surface of the opaque white plastic film 29 as viewed in FIG. 2 may, by suitable means and methods known to the prior art, have the layer of pressure sensitive adhesive 24 and release liner 25 applied thereto.

It will be understood by those skilled in the art that the apparatus and method disclosed in FIG. 3 are merely illustrative of one apparatus and method suitable for producing the phosphorescent film 20 of the present invention and that upon gaining an understanding of the novel phosphorescent film 20 of the present invention those of ordinary skill in the laminated film manufacturing art will know of various other apparatus and methods of producing the novel phosphorescent film 20 of the present invention.

It will be understood by those skilled in the art that the term "dry adhesive" as used in this specification and the appended claims is used to mean an adhesive which, at the time the iridescent of phosphorescent particles are applied thereto, is dry in the sense that at such time no solvents are present whether previously present and previously dried off. Examples of such clear "dry adhesive" useful in the preferred embodiment of the present invention are pressure sensitive acrylic, synthetic rubber or similar type adhesives. It will be further understood by those skilled in the art that the term "dry adhesive" may be tacky or slightly tacky at the time the iridescent or phosphorescent particles are applied thereto. The term "dry iridescent particles" and the term "dry phosphorescent particles" are used in this specification and the appended claims to mean iridescent and phosphorescent particles which, at the time they are applied to the dry adhesive, are not in solution or suspended in a mixture of wet adhesive and solvent.

It has been found that the body of substantially transparent iridescent material 21 provides a decorative effect to the material, and to articles made therefrom, in visible light, and yet does not significantly diminish the transmission of light therethrough whereby the after-glow is not significantly diminished.

Referring again to FIG. 3, in accordance with the further teachings of the present invention with regard to apparatus and method of providng the phosphorescent material or film 20 of the present invention, upon the opaque white plastic film 29 and dry adhesive 28 having the layer of dry phosphorescent particles 30 residing thereon, and the clear plastic film 26 and dry adhesive 27 having the layer of dry iridescent particles 40 residing thereon passing between the nip rollers 51 and 52 heat and pressure are applied thereto by the nip rollers in a heat range of 120° F.–150° F. and at a pressure of approximately 40 lbs. per square inch; the phosphorescent particles may be phosphorescent pigment particles in the range of 20–300 microns with a preferred range of 75–150 microns.

Figure 4:
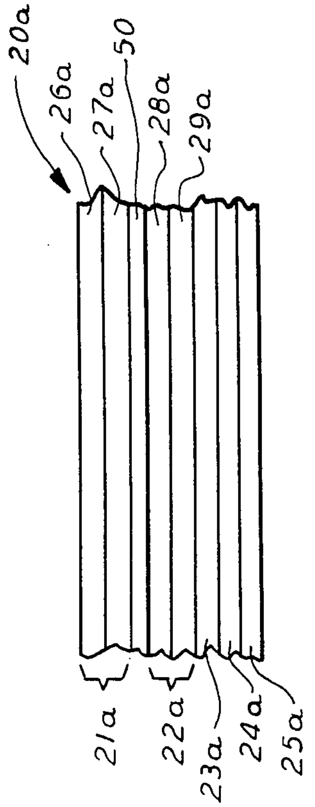
FIG. 4 is a diagrammatic, cross-sectional partial view of an alternate embodiment of the improved phosphorescent film or material embodying the present invention.
Figure 5:
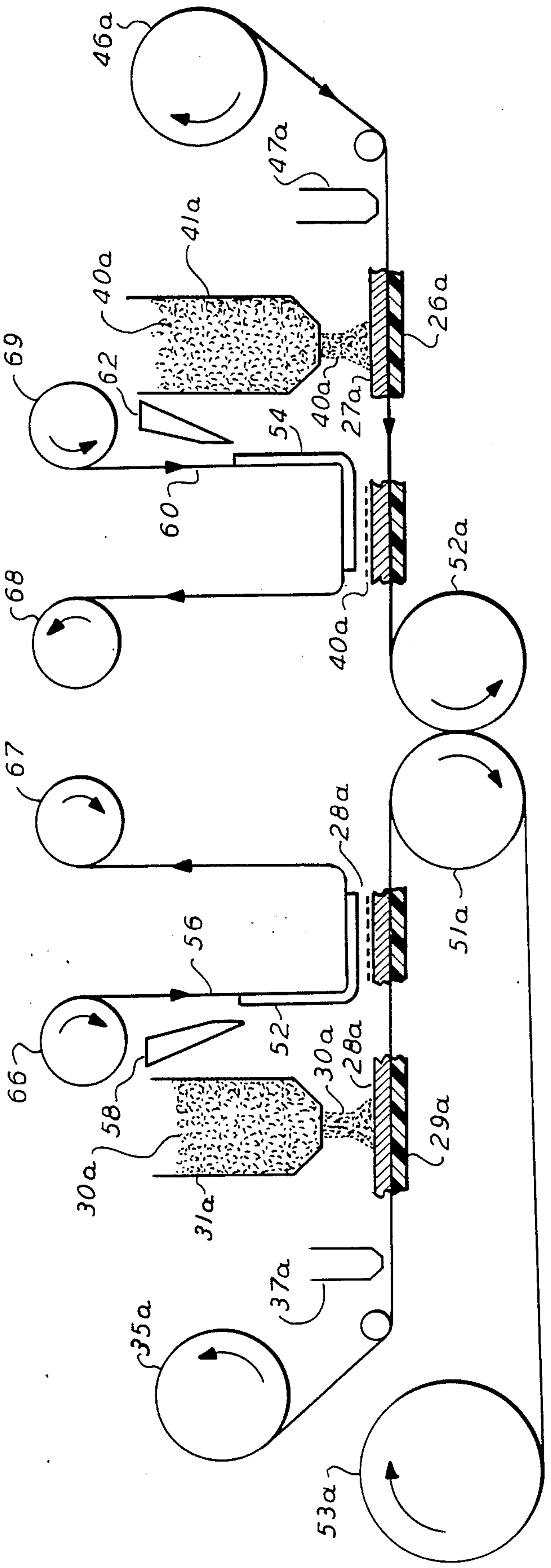
FIG. 5 is a diagrammatic illustration of an alternate embodiment of apparatus and process for producing the alternate improved phosphorescent film of the present invention.

Referring now to FIGS. 4 and 5 where structure and items similar to that illustrated in FIGS. 2 and 3 have been given similar reference numerals followed by the additional and distinguishing reference character a, there are shown, respectively, an alternate embodiment of improved decorative phosphorescent film 20*a* embodying the present invention and an alternate embodiment of apparatus and process for manufacturing such film. Referring specifically to FIG. 4, the alternate decorative phosphorescent film 20*a* differs from decorative phosphorescent film 20 of FIG. 2 by the inclusion of an additional layer of substantially clear dry adhesive 50 which may be a single additional layer of substantially clear dry adhesive as illustrated diagrammatically in FIG. 4, or may be in the further alternative, as illustrated in FIG. 5, at least two additional layers of substantially clear dry adhesive, one additional layer of dry adhesive 52 applied to the dry phosphorescent particles 30*a* after their application to the layer of dry adhesive 28*a* and a second additional layer of substantially clear dry adhesive 54 applied to the layer of substantially transparent dry iridescent particles 40*a* after their application to the layer of substantially clear dry adhesive 27*a*. The additional layers of substantially clear dry adhesive 52 and 54 are applied, respectively, and as illustrated in FIG. 5, to the layers of dry phosphorescent particles 30*a* and dry substantially transparent iridescent particles 40*a* by the transfer process, namely the substantially clear dry adhesive 52 is first applied to a transfer layer of silicone coated release liner 56 by a suitable dry adhesive applicator 58 whereafter the dry adhesive 52 is transferred to the dry phosphorescent particles 28*a*, and the substantially clear dry adhesive 54 is first applied to a transfer layer of silicone coated release line 60 by a suitable dry adhesive applicator 62 whereafter the dry adhesive 54 is transferred to the dry iridescent particles 40*a*.

in the preferred alternate embodiment, the layer of substantially clear dry adhesive 50 of FIG. 4 is a single layer of such dry adhesive and has a thickness of from 0.0005–0.002, preferably 0.001 inch.

A further distinction between the present invention and the prior art phosphorescent film or material is that in the typical manufacture of the prior art phosphorescent material a calendaring step is used to incorporate the phosphorescent pigment into the plastisol. Calendaring, as is known to those skilled in the art, produces shear which is destructive of the crystalline structure of the phosphorescent pigment and since the phosphorescent afterglow is dependent on the crystalline structure of the pigment, such calendaring is generally disadvantageous. Since no calendaring is used in the manufacture of the phosphorescent film or material of the present invention, the present invention provides a further advantage over the phosphorescent film or material of the prior art.

Figure 6:
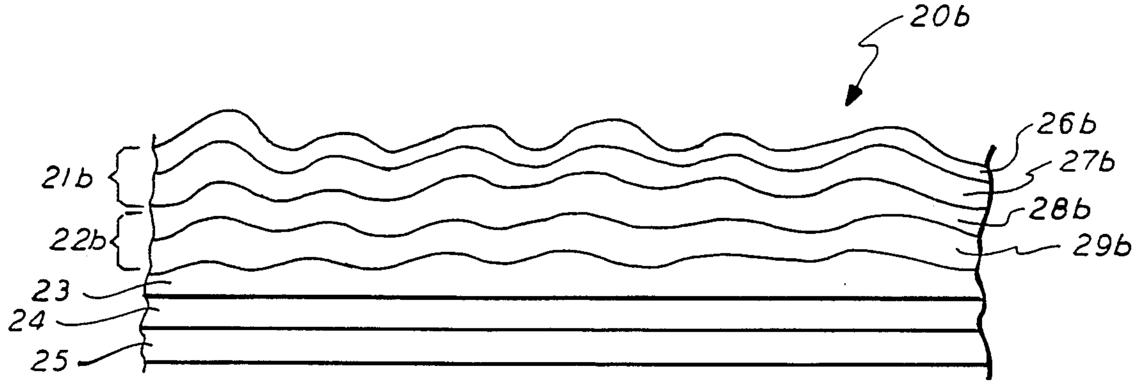
FIGS. 6 and 7 are diagrammatic, cross-sectional, partial views of alternate embodiments of improved phosphorescent film or material embodying the present invention.
Figure 7:
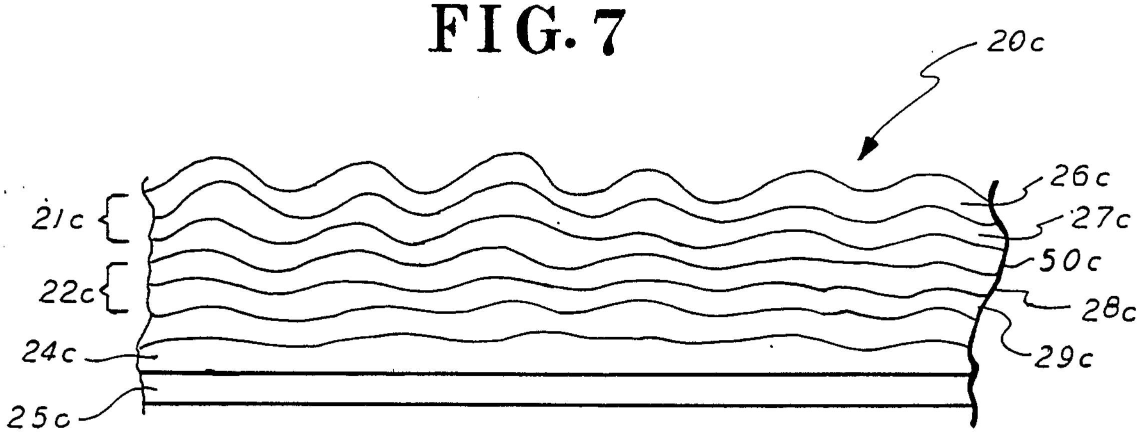

Referring now to FIGS. 6 and 7, there are illustrated, diagrammatically, in elevational cross-sectional view, further alternate embodiments of the phosphorescent material of the present invention decorative in visible light.

In FIG. 6, phosphorescent film 20*b* is substantially the same as that illustrated in FIG. 2 and described above except that at least the body of substantially transparent iridescent material 21*b* is embossed, as illustrated diagrammatically, providing an enhanced light refracting surface which further enhances the iridescent decorative effect in visible light provided by the body of substantially transparent iridescent material 21*b*. Similarly, phosphorescent film 20*c* is substantially the same as phosphorescent film 20*a* illustrated in FIG. 4 and described above except that, at least the body of substantially transparent iridescent material 21*c* is embossed providing an enhanced light refractive surface which further enhances the iridescent decorative effect in visible light provided by such body of substantially transparent iridescent material.

It will be understood that if such embossing also embosses lower layers as illustrated diagrammatically in FIGS. 6 and 7, such is acceptable and it will be understood that the depth of embossing is immaterial except that such embossing must at least emboss the bodies of substantially transparent iridescent material 21*b* and 21*c*. Still further, it will be understood that such embossing may be of a random or irregular configuration or, if desired, may be of a predetermined design such as a diamond pattern, rectangles or squares, circles, etc. and the like.

It will be still further understood by those skilled in the art that many variations and modifications may be made in the present invention without departing from the spirit and the scope thereof.

What is claimed is:

1. Process of making phosphorescent material decorative in visible light, comprising the steps of:

providing a first layer of substantially clear dry adhesive to a support layer of substantially opaque material;

providing a second layer of substantially clear dry adhesive to a layer of substantially clear plastic film;

applying a layer of dry phosphorescent particles to said first layer of substantially clear dry adhesive;

providing a layer of dry substantially transparent iridescent particles to said second layer of substantially clear dry adhesive; and assembling said layers wherein said support layer of substantially opaque material and said layer of substantially clear plastic film each face outward and applying predetermined heat and pressure to said layers to bond said layers together wherein the combination of the iridescent particle layer and the phosphorescent particle layer provides an iridescent decorative effect in visible light and a substantial after-glow effect in darkness.

2. Process according to claim 1 including the further step of:

providing a third layer of dry adhesive between said first and second layers of dry adhesive.

3. Process according to claim 1 wherein said predetermined heat and pressure are, respectively, 120° F.–150° F. and approximately 40 lbs. per square inch.

4. Process according to claim 1 or 2 including the further step of embossing at least said layer of substantially clear plastic film and said layer of dry substantially transparent iridescent particles.

* * * * *